United States Patent
Bian

(10) Patent No.: US 12,210,135 B2
(45) Date of Patent: Jan. 28, 2025

(54) OPTICAL COMPONENTS WITH AN ADJACENT METAMATERIAL STRUCTURE

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 243 days.

(21) Appl. No.: 17/991,160

(22) Filed: Nov. 21, 2022

(65) Prior Publication Data

US 2024/0168199 A1  May 23, 2024

(51) Int. Cl.
  *G02B 1/00*  (2006.01)
  *G02B 6/122*  (2006.01)
  *G02B 6/125*  (2006.01)
  *G02B 6/13*  (2006.01)

(52) U.S. Cl.
  CPC ........... *G02B 1/002* (2013.01); *G02B 6/1228* (2013.01); *G02B 6/125* (2013.01); *G02B 6/13* (2013.01)

(58) Field of Classification Search
  None
  See application file for complete search history.

(56) References Cited

U.S. PATENT DOCUMENTS

| | | | |
|---|---|---|---|
| 9,122,066 B2 | 9/2015 | Baker | |
| 9,366,818 B1 | 6/2016 | Lin et al. | |
| 9,645,312 B2 | 5/2017 | Barwicz et al. | |
| 10,429,581 B1 | 10/2019 | Thomas et al. | |
| 10,429,582 B1 | 10/2019 | Bian et al. | |
| 10,444,433 B1 | 10/2019 | Bian et al. | |
| 10,641,956 B1 | 5/2020 | Bian et al. | |
| 10,816,728 B1 | 10/2020 | Bian et al. | |
| 10,955,614 B1 * | 3/2021 | Peng | H01L 22/34 |
| 10,996,398 B1 | 5/2021 | Bian et al. | |
| 11,105,978 B2 * | 8/2021 | Bian | G02B 6/107 |
| 11,125,944 B2 | 9/2021 | Bian et al. | |
| 2006/0120657 A1 | 6/2006 | Little | |
| 2021/0055477 A1 * | 2/2021 | Bian | G02B 1/002 |
| 2022/0120966 A1 | 4/2022 | Liu et al. | |
| 2022/0146748 A1 | 5/2022 | Bian | |

(Continued)

FOREIGN PATENT DOCUMENTS

| | | |
|---|---|---|
| CN | 113985524 A | 1/2022 |
| WO | 2021168465 A1 | 8/2021 |

OTHER PUBLICATIONS

European Patent Office, Extended European Search Report and Opinion issued in European Patent Application No. 23204511.2 on Apr. 24, 2024; 8 pages.

(Continued)

*Primary Examiner* — Jerry Rahll
(74) *Attorney, Agent, or Firm* — Thompson Hine LLP; Anthony Canale

(57) ABSTRACT

Structures for an optical component, such as a polarization splitter rotator, and methods of forming such structures. The structure comprises a waveguide core positioned in a vertical direction over a substrate, and a metamaterial structure positioned in a lateral direction adjacent to the waveguide core. The metamaterial structure including a plurality of elements separated by a plurality of gaps and a dielectric material in the plurality of gaps.

20 Claims, 5 Drawing Sheets

(56) References Cited

U.S. PATENT DOCUMENTS

2023/0119155 A1\* 4/2023 Kim .................... G02B 6/1223
385/123

OTHER PUBLICATIONS

Yu Zejie et al: "Subwavelength-Structure-Assisted Ultracompact Polarization-Handling Components on Silicon." Journal of Lightwave Technology, IEEE, USA, vol. 40, No. 6, Dec. 13, 2021 (Dec. 13, 2021), pp. 1784-1801.

Luciano Socci, Vito Sorianello, and Marco Romagnoli, "300 nm bandwidth adiabatic SOI polarization splitter-rotators exploiting continuous symmetry breaking," Optics Express 23, 19261-19271 (2015).

Zhan Su, Erman Timurdogan, Ehsan Shah Hosseini, Jie Sun, Gerald Leake, Douglas D. Coolbaugh, and Michael R. Watts, "Four-port integrated polarizing beam splitter," Optics Letter 39, 965-968 (2014).

Wesley D. Sacher, Tymon Barwicz, Benjamin J. F. Taylor, and Joyce K. S. Poon, "Polarization rotator-splitters in standard active silicon photonics platforms," Optics Express 22, 3777-3786 (2014).

Yunhong Ding, Haiyan Ou, and Christophe Peucheret, "Wideband polarization splitter and rotator with large fabrication tolerance and simple fabrication process," Optics Letters 38, 1227-1229 (2013).

Yang Liu, Limin Chang, Zezheng Li, Lei Liu, Huan Guan, and Zhiyong Li, "Polarization beam splitter based on a silicon nitride silica-silicon horizontal slot waveguide," Opt. Lett. 44, 1335-1338 (2019).

Xiao Sun, J. Stewart Aitchison, and Mo Mojahedi, "Realization of an ultra-compact polarization beam splitter using asymmetric MMI based on silicon nitride / silicon-on-insulator platform," Optics Express 25, 8296-8305 (2017).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.

Y. Bian et al., "Integrated Laser Attach Technology on a Monolithic Silicon Photonics Platform," 2021 IEEE 71st Electronic Components and Technology Conference (ECTC), 2021, pp. 237-244, doi: 10.1109/ECTC32696.2021.00048.

B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th3I.4.

Y. Bian et al., "Monolithically integrated silicon nitride platform," 2021 Optical Fiber Communications Conference and Exhibition (OFC), pp. 1-3 (2021).

A. Aboketaf et al., "Towards fully automated testing and characterization for photonic compact modeling on 300-mm wafer platform," 2021 Optical Fiber Communications Conference and Exhibition (OFC), 2021, pp. 1-3.

Bian, Yusheng "Polarization Rotators With Overlapping Waveguide Cores" filed on Sep. 9, 2022 as a U.S. Appl. No. 17/941,055.

Bian, Yusheng et al., "Photonic Integrated Circuit Structure With Polarization Device for High Power Applications" filed on Jun. 22, 2022 as a U.S. Appl. No. 17/808,168.

Bian, Yusheng "Optical Couplers With Diagonal Light Transfer" filed on Nov. 11, 2021 as a U.S. Appl. No. 17/524,218.

\* cited by examiner

OPTICAL COMPONENTS WITH AN ADJACENT METAMATERIAL STRUCTURE

BACKGROUND

The disclosure relates to photonics chips and, more specifically, to structures for an optical component, such as a polarization splitter rotator, and methods of forming such structures.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

Polarization splitter rotators are a type of optical component commonly found in photonics chips that combines an optical splitter with a polarization rotator. A polarization splitter rotator may be configured to receive optical signals of a given polarization state (e.g., the fundamental transverse magnetic (TM0) polarization) as input and to output a different polarization state (e.g., the fundamental transverse electric (TE0) polarization), as well as to split the received optical signals with a desired coupling ratio. Unfortunately, conventional polarization splitter rotators may possess a large device footprint and may exhibit higher than desirable light loss.

Improved structures for an optical component, such as a polarization splitter rotator, and methods of forming such structures are needed.

SUMMARY

In an embodiment of the invention, a structure comprises a waveguide core positioned in a vertical direction over a substrate, and a metamaterial structure positioned in a lateral direction adjacent to the waveguide core. The metamaterial structure including a plurality of elements separated by a plurality of gaps and a dielectric material in the plurality of gaps.

In an embodiment of the invention, a method comprises forming a waveguide core positioned in a vertical direction over a substrate, and forming a metamaterial structure positioned in a lateral direction adjacent to the waveguide core. The metamaterial structure includes a plurality of elements separated by a plurality of gaps and a dielectric material in the plurality of gaps.

BRIEF DESCRIPTION OF THE DRAWINGS

The accompanying drawings, which are incorporated in and constitute a part of this specification, illustrate various embodiments of the invention and, together with a general description of the invent ion given above and the detailed description of the embodiments given below, serve to explain the embodiments of the invention. In the drawings, like reference numerals refer to like features in the various views.

DETAILED DESCRIPTION

Figure 1:
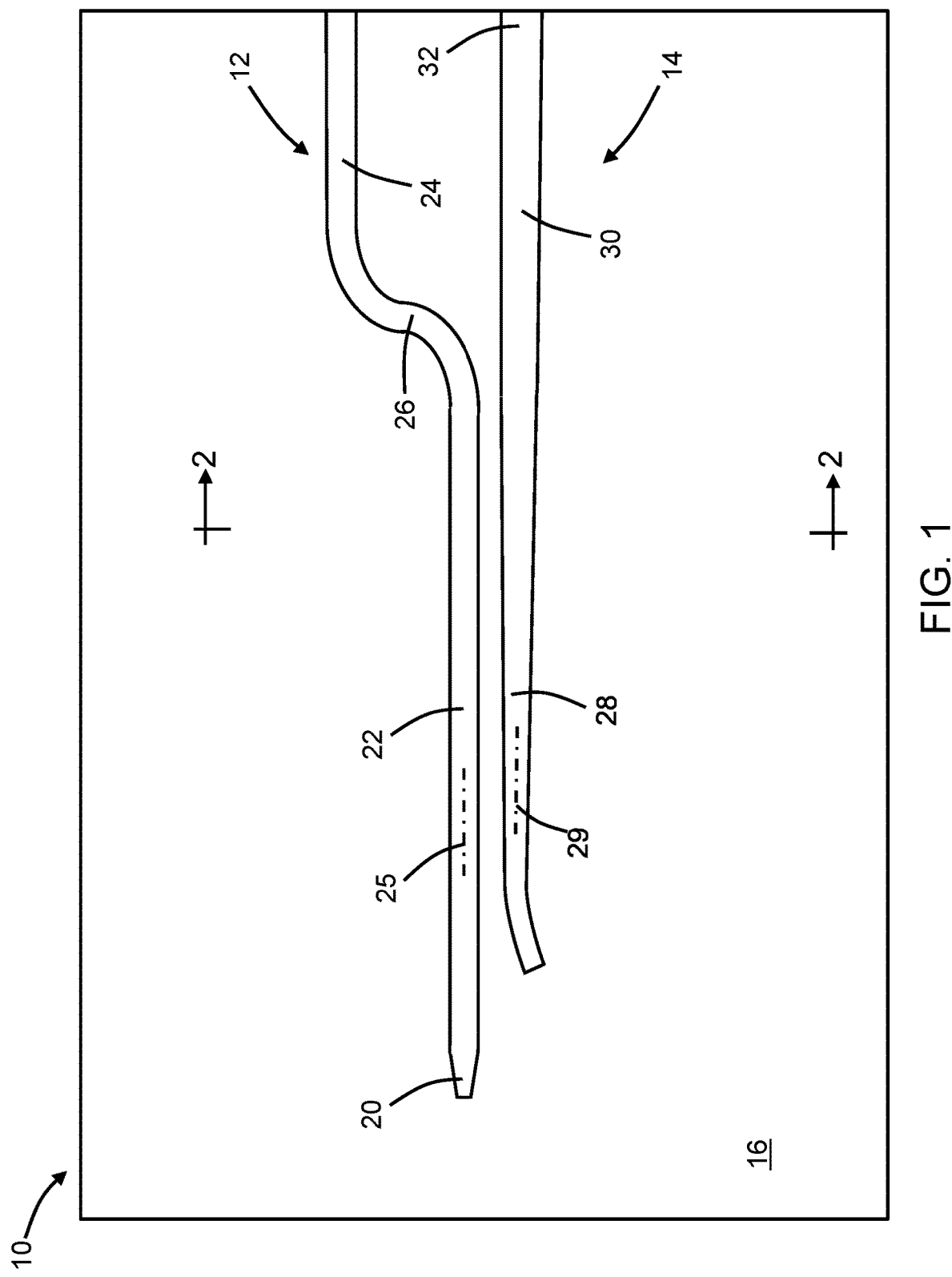
FIG. 1 is a top view of a structure at an initial fabrication stage of a processing method in accordance with embodiments of the invention.
Figure 2:
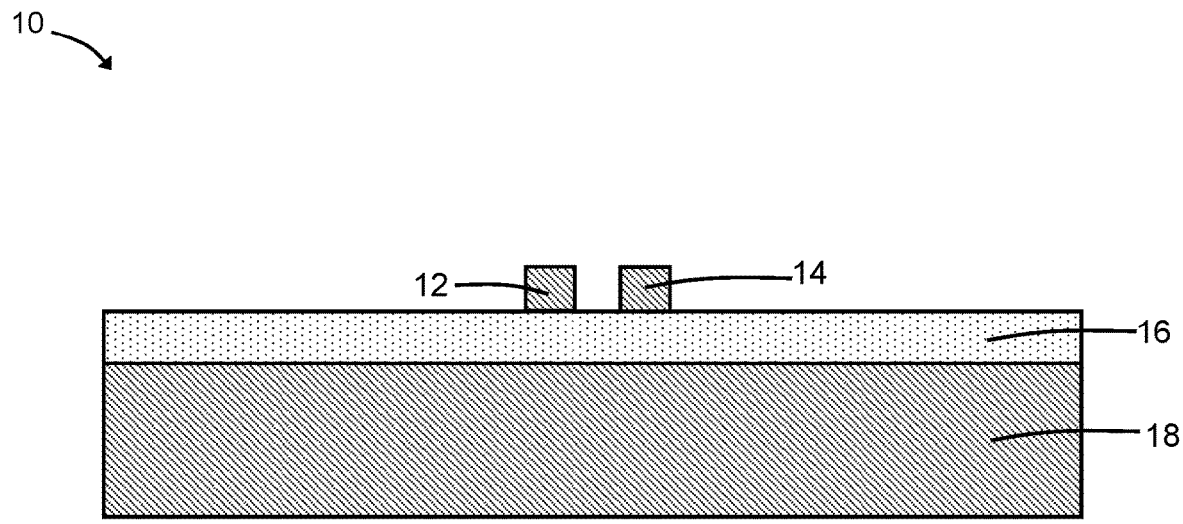
FIG. 2 is a cross-sectional view of the structure taken generally along line 2-2 in FIG. 1.

With reference to FIGS. 1, 2 and in accordance with embodiments of the invention, a structure 10 for a polarization splitter rotator includes a waveguide core 12 and a waveguide core 14 that are positioned on, and over, a dielectric layer 16 and a semiconductor substrate 18. In an embodiment, the dielectric layer 16 may be comprised of a dielectric material, such as silicon dioxide, and the semiconductor substrate 18 may be comprised of a semiconductor material, such as single-crystal silicon. In an embodiment, the dielectric layer 16 may be a buried oxide layer of a silicon-on-insulator substrate, and the dielectric layer 16 may separate the waveguide cores 12, 14 from the semiconductor substrate 18.

In an embodiment, the waveguide cores 12, 14 may be comprised of a material having a refractive index that is greater than the refractive index of silicon dioxide. In an embodiment, the waveguide cores 12, 14 may be comprised of a semiconductor material, such as single-crystal silicon or polysilicon. In an alternative embodiment, the waveguide cores 12, 14 may be comprised of a dielectric material, such as silicon nitride, silicon oxynitride, or aluminum nitride. In alternative embodiments, other materials, such as a polymer or a III-V compound semiconductor, may be used to form the waveguide cores 12, 14.

In an embodiment, the waveguide cores 12, 14 may be formed by patterning a layer comprised of a material with lithography and etching processes. In an embodiment, an etch mask may be formed by a lithography process over the layer, and unmasked sections of the deposited layer may be etched and removed with an etching process. The masked sections of the deposited layer may determine the patterned shapes of the waveguide cores 12, 14. In an embodiment, the waveguide cores 12, 14 may be formed by patterning the semiconductor material (e.g., single-crystal silicon) of a device layer of a silicon-on-insulator substrate. In an embodiment, the waveguide cores 12, 14 may be formed by patterning a deposited layer comprised of the material (e.g., polysilicon). In an alternative embodiment, a slab layer may be connected to a lower portion of the waveguide core 12 and/or the waveguide core 14. The slab layer may be formed when the waveguide cores 12, 14 are patterned, and the slab layer, which is positioned on the dielectric layer 16, may have a thickness that is less than the thickness of the waveguide cores 12, 14.

The waveguide core 12 includes a tapered section 20, a coupling section 22, and an output section 24 connected to the coupling section 22 by a set of bends 26. The output section 24 of the waveguide core 12 may be connected to downstream optical components on a photonics chip associated with the structure 10. The sections 20, 22 of the waveguide core 12 may be aligned along a longitudinal axis 25.

The waveguide core 14 includes a coupling section 28 positioned in a lateral direction adjacent to the coupling section 22 of the waveguide core 12, a rotator section 30, and an output section 32 connected to the rotator section 30.

The coupling section 28 of the waveguide core 14 may be terminated by a bend. The bends 26 of the waveguide core 12 increase the separation between the waveguide cores 12, 14 such that the light coupling between the output section 24 of the waveguide core 12 and the rotator section 30 is negligible. The coupling section 28 and the rotator section 30 of the waveguide core 14 may each be tapered over at least a portion of their respective lengths. The sections 28, 30 of the waveguide core 14 may be aligned along a longitudinal axis 29. The output section 32 of the waveguide core 14 may be connected to downstream optical components on the photonics chip.

Figure 3:
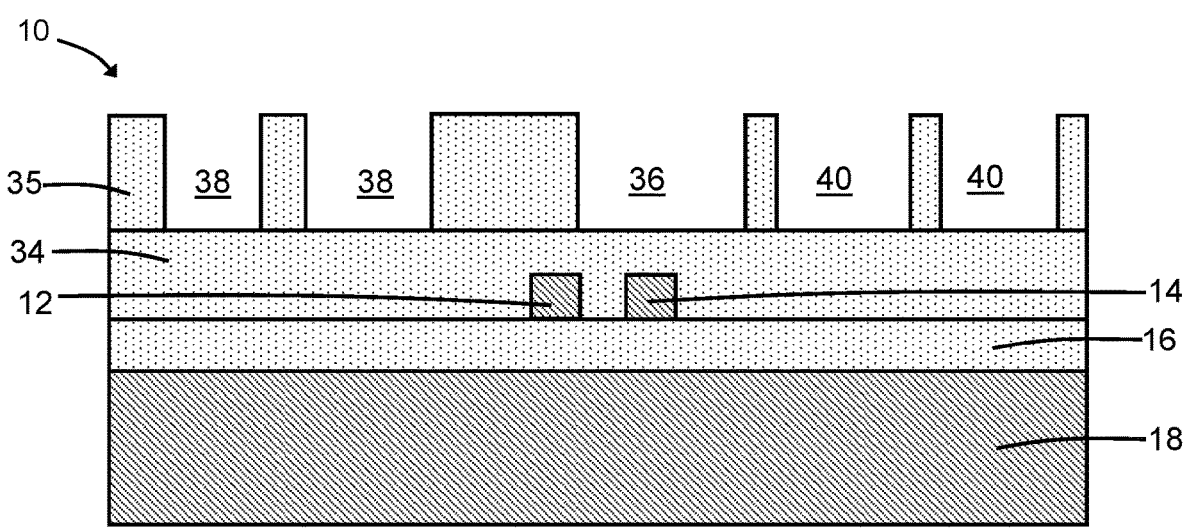
FIG. 3 is a cross-sectional view of the structure at a fabrication stage subsequent to FIG. 2.

With reference to FIG. 3 in which like reference numerals refer to like features in FIG. 2 and at a subsequent fabrication stage, a dielectric layer 34 is formed over the waveguide cores 12, 14. The waveguide cores 12, 14 are embedded in the dielectric layer 34, which may be deposited and planarized after deposition, because the dielectric layer 34 is thicker than the height of the waveguide cores 12, 14. A dielectric layer 35 may be formed over the dielectric layer 34. The dielectric layers 34, 35 may be comprised of a dielectric material, such as silicon dioxide, having a refractive index that is less than the refractive index of the material constituting the waveguide cores 12, 14.

A series of trenches 36, 38, 40 may be patterned in the dielectric layer 35. The trench 36 may be subsequently utilized to form a waveguide core, the trenches 38 may be used to form a set of elements incorporated into a metamaterial structure, and the trenches 40 may be used to form a set of elements incorporated into a different metamaterial structure. The trench 36 may be positioned in a lateral direction between the trenches 38 and the trenches 40. The trenches 36, 38, 40 may penetrate fully through the dielectric layer 35 to the dielectric layer 34. Each of the trenches 38, 40 includes a pair of lower corners adjacent to the dielectric layer 34. The trench 36 is positioned over the waveguide core 14, and the trench 36 is positioned in a lateral direction between the trenches 38 and the trenches 40. The number of trenches 38 may be increased to increase the number of subsequently-formed elements. The number of trenches 40 may be increased to increase the number of subsequently-formed elements. In an embodiment, the number of trenches 38 may be equal to the number of trenches 40.

Figure 4:
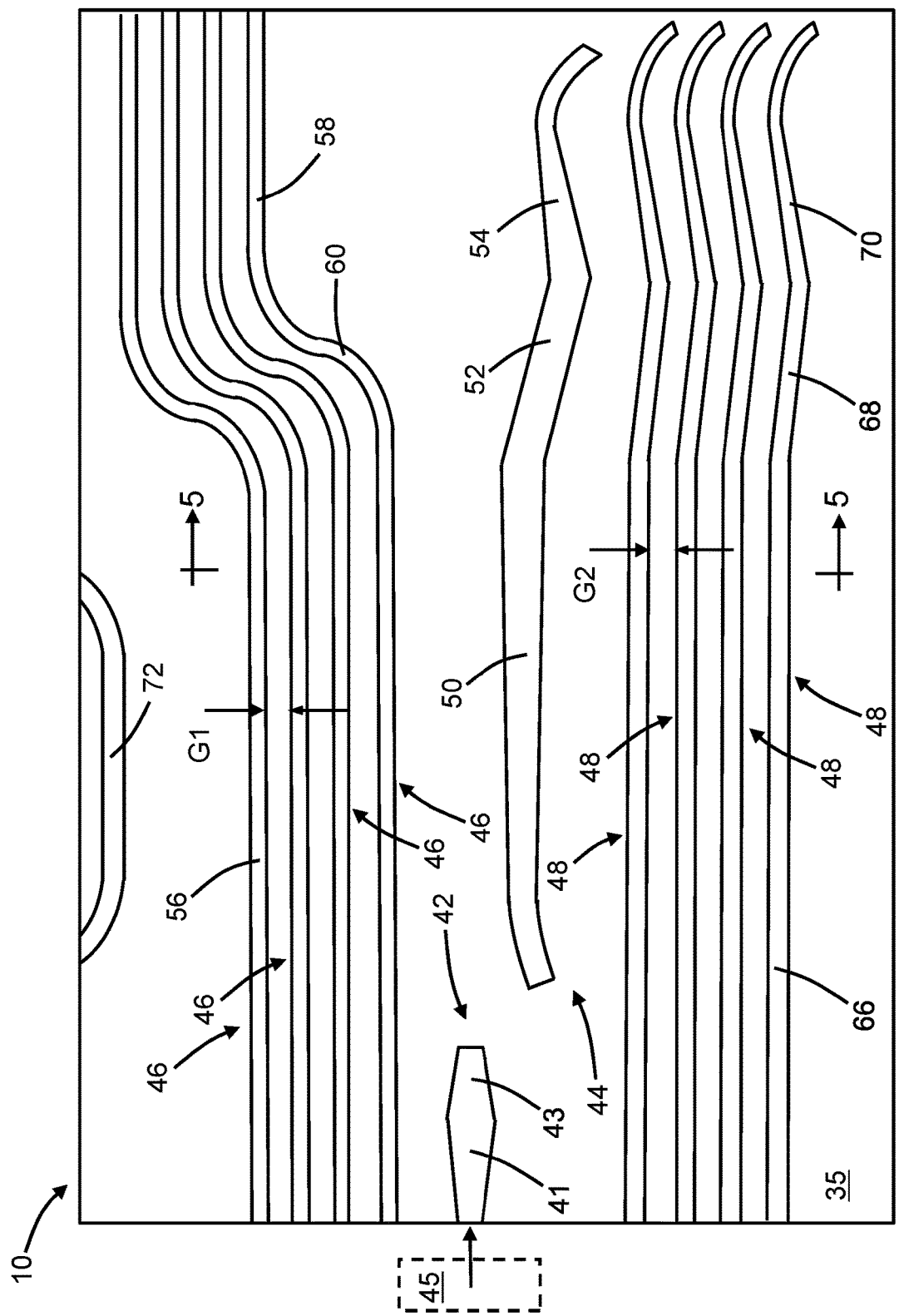
FIG. 4 is a top view of the structure at a fabrication stage subsequent to FIG. 3.

With reference to FIG. 4, 5 in which like reference numerals refer to like features in FIG. 3 and at a subsequent fabrication stage, a waveguide core 44, a set of elements 46, and a set of elements 48 are respectively formed in the trenches 36, 38, 40 (FIG. 3) in the dielectric layer 34. A waveguide core 42 that includes a tapered section 41 and a tapered section 43 may be formed in a trench (not shown) similar to the trench 36. The waveguide cores 42, 44 and the elements 46, 48 may be comprised of a dielectric material, such as silicon nitride, having a refractive index that is greater than the refractive index of silicon dioxide. In an alternative embodiment, the waveguide cores 42, 44 and the elements 46, 48 may be comprised of aluminum nitride or silicon oxynitride. In an embodiment, waveguide cores 42, 44 and the elements 46, 48 may be formed by depositing a layer of their constituent material over the patterned dielectric layer 35 and patterning the deposited layer by lithography and etching processes. The lithographically-formed etch mask employed during patterning may mask and protect a portion of the deposited layer in the trench 36 resulting in the formation of the waveguide core 44, as well as mask and protect another portion of the deposited layer resulting in the formation of the waveguide core 42. In an embodiment, the elements 46 and the elements 48 may result from the etching of unmasked portions of the deposited layer in the trenches 38, 40. In an embodiment, the elements 46 may be formed in the lower corners of the trenches 38 adjacent to the dielectric layer 34, and the elements 48 may be formed in the lower corners of the trenches 40 adjacent to the dielectric layer 34. The width of the trenches 38 and the spacing between adjacent trenches 38 may determine the positions of the elements 46 relative to the waveguide core 12 and relative to each other. The width of the trenches 40 and the spacing between adjacent trenches 40 may determine the positions of the elements 48 relative to the waveguide cores 14 and the waveguide core 44.

The tapered section 43 of the waveguide core 42 may overlap with the tapered section 20 of the waveguide core 12. A portion of the dielectric layer 34 is positioned between the tapered section 43 and the tapered section 20. The overlap of the tapered section 43 with the tapered section 20 may enable the downward transfer of light from the waveguide core 44 to the waveguide core 12.

The waveguide core 44 may include a tapered section 50 that overlaps with the coupling section 28 of the waveguide core 14, and rotator sections 52, 54 that overlap with the rotator section 30 of the waveguide core 14. A portion of the dielectric layer 34 is positioned between the tapered section 50 and the coupling section 28, and a portion of the dielectric layer 34 is positioned between the rotator sections 52, 54 and the rotator section 30. The overlap of the tapered section 50 with the coupling section 28 may improve the efficiency of light coupling from the coupling section 22 of the waveguide core 12 to the coupling section 28 of the waveguide core 14. The rotator section 52 may be angled to reduce the overlap with the rotator section 30 with increasing distance from the tapered section 50, and the rotator section 54 may be angled to increase the overlap with the rotator section 30 with increasing distance from the tapered section 50. The overlap of the rotator sections 52, 54 of the waveguide core 44 with the rotator section 30 of the waveguide core 14 may facilitate the rotation of the polarization of the transferred light propagating in the waveguide core 14.

The elements 46, which have a juxtaposed (i.e., side-by-side) arrangement, are constituted by elongated ridges (i.e., strips that are longer than wide) and, due to the juxtaposed arrangement, gaps G1 separate adjacent elements 46 to define a grating-like structure. Some of the gaps G1 are filled by the dielectric material of the patterned dielectric layer 35 remaining between the trenches 38. The number of elements 46 may be increased by increasing the number of trenches 38 patterned in the dielectric layer 35. In an embodiment, an even number of elements 46 may be formed as a result of formation of pairs of elements 46 at the lower corners of each trench 38. In an embodiment, the elements 46 may have a triangular profile as a result of the constraint imposed by formation at the trench corners. In alternative embodiments, the elements 46 may have a differently-shaped profile.

Each element 46 may include a section 56, a section 58, and a bend 60 connecting the section 56 to the section 58. The elements 46 are positioned adjacent to the waveguide core 12 and the waveguide core 42, and the elements 46 have a non-overlapping relationship with the waveguide core 12. The section 56 of each element 46 is positioned adjacent to the tapered section 20 and coupling section 22 of the waveguide core 12, as well as adjacent to the sections 41, 43 of the waveguide core 42. The section 58 of each element 46 is positioned adjacent to the output section 24 of the waveguide core 12. The bend 60 of each element 46 is positioned adjacent to the bend 26. In an embodiment, the section 56 of each element 46 may be aligned parallel to the tapered section 20 and coupling section 22 of the waveguide core 12. In an embodiment, the section 58 of each element 46 may be aligned parallel to the output section 24 of the waveguide core 12.

The elements 46 may have identical or substantially-identical sections 56, 58, 60 such that the elements 46 have matching layouts and such that the dimension of the gaps G1 between adjacent elements 46 is uniform. A portion of each element 46 may have a matching shape to the waveguide core 12. In particular, the shape of at least the element 46 closest to the waveguide core 12 may be substantially identical to the shape of the waveguide core 12 so as to respect a minimum spacing associated with a keep-out zone.

In the representative embodiment, the elements 46 are disconnected from each other. In an embodiment, the pitch and duty cycle of the elements 46 may be uniform to define a periodic juxtaposed arrangement. In alternative embodiments, the pitch and/or the duty cycle of the elements 46 may be apodized (i.e., non-uniform) to define a non-periodic juxtaposed arrangement.

The elements 48, which have a juxtaposed (i.e., side-by-side) arrangement, are constituted by elongated ridges (i.e., strips that are longer than wide) and, due to the juxtaposed arrangement, gaps G2 separate adjacent elements 48 to define a grating-like structure. Some of the gaps G2 are filled by the dielectric material of the patterned dielectric layer 35 remaining between the trenches 40. The number of elements 48 may be increased by increasing the number of trenches 40 patterned in the dielectric layer 35. In an embodiment, an even number of elements 48 may be formed as a result of formation of pairs of elements 48 at the lower corners of each trench 40. In an embodiment, the elements 48 may have a triangular profile as a result of the constraint imposed by formation at the trench corners. In alternative embodiments, the elements 48 may have a differently-shaped profile. In an embodiment, the number of elements 48 may be equal to the number of elements 46.

Each element 48 may include a section 66, a section 68 that is angled relative to section 66, and a section 70 that is angled relative to the section 68. The section 68 may connect the section 66 to the section 70. The elements 48 are positioned adjacent to the waveguide core 14 and the waveguide core 44, and the elements 48 have a non-overlapping relationship with the waveguide core 14. The section 66 of each element 48 is positioned adjacent to the coupling section 28 of the waveguide core 14 and the section 50 of the waveguide core 44. The section 68 of each element 48 is positioned adjacent to a portion of the rotator section 30 of the waveguide core 14 and the section 52 of the waveguide core 44. The section 70 of each element 48 is positioned adjacent to a portion of the rotator section 30 of the waveguide core 14 and the section 54 of the waveguide core 44. In an embodiment, the section 66 of each element 48 may be aligned parallel to the tapered section 20 and coupling section 22 of the waveguide core 12. In an embodiment, the section 68 of each element 48 may be aligned parallel to section 52 of the waveguide core 44 and the section 70 of each element 48 may be aligned parallel to section 54 of the waveguide core 44.

The elements 48 may have identical or substantially-identical sections 66, 68, 70 such that the elements 48 have matching layouts and such that the dimension of the gaps G2 between adjacent elements 48 is uniform. A portion of each element 48 may have a matching shape to the waveguide core 12. In particular, the shape of at least the element 48 closest to the waveguide core 12 may be substantially identical to the shape of the waveguide core 12 so as to respect a minimum spacing associated with a keep-out zone.

In the representative embodiment, the elements 48 are disconnected from each other. In an embodiment, the pitch and duty cycle of the elements 48 may be uniform to define a periodic juxtaposed arrangement. In alternative embodiments, the pitch and/or the duty cycle of the elements 48 may be apodized (i.e., non-uniform) to define a non-periodic juxtaposed arrangement.

The tapered section 41 of the waveguide core 42 may define an edge coupler that is positioned at an edge of a photonics chip and adjacent to a light source, diagrammatically shown by reference numeral 45. The light source 45 is configured to provide light (e.g., laser light) in a mode propagation direction, as indicated by the single-headed arrow, toward the tapered section 41 of the waveguide core 42. The light received by the edge coupler may have a given wavelength, intensity, mode shape, and mode size, and the edge coupler may provide spot-size conversion for the light before transferring the light to the waveguide core 12. In an embodiment, the light source 45 may be a single-mode optical fiber that is positioned at the edge of the photonics chip adjacent to the tapered section 41 of the waveguide core 42.

The edge coupler may include additional waveguide cores arranged adjacent to the tapered section 41 to provide multiple tips, such as a trident arrangement with the tapered section 41 positioned between a pair of added waveguide cores. The tapered section 41 may be segmented over at least a portion of its length to define a subwavelength metamaterial structure and may optionally include a central rib overlaid on the segments.

Figure 5:
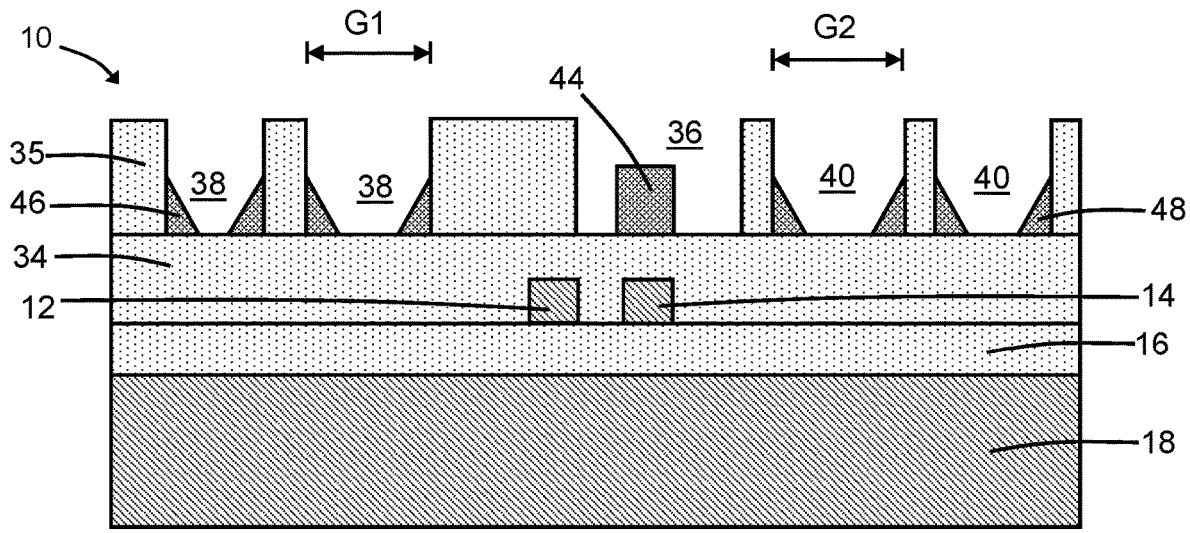
FIG. 5 is a cross-sectional view of the structure taken generally along line 5-5 in FIG. 4.
Figure 6:
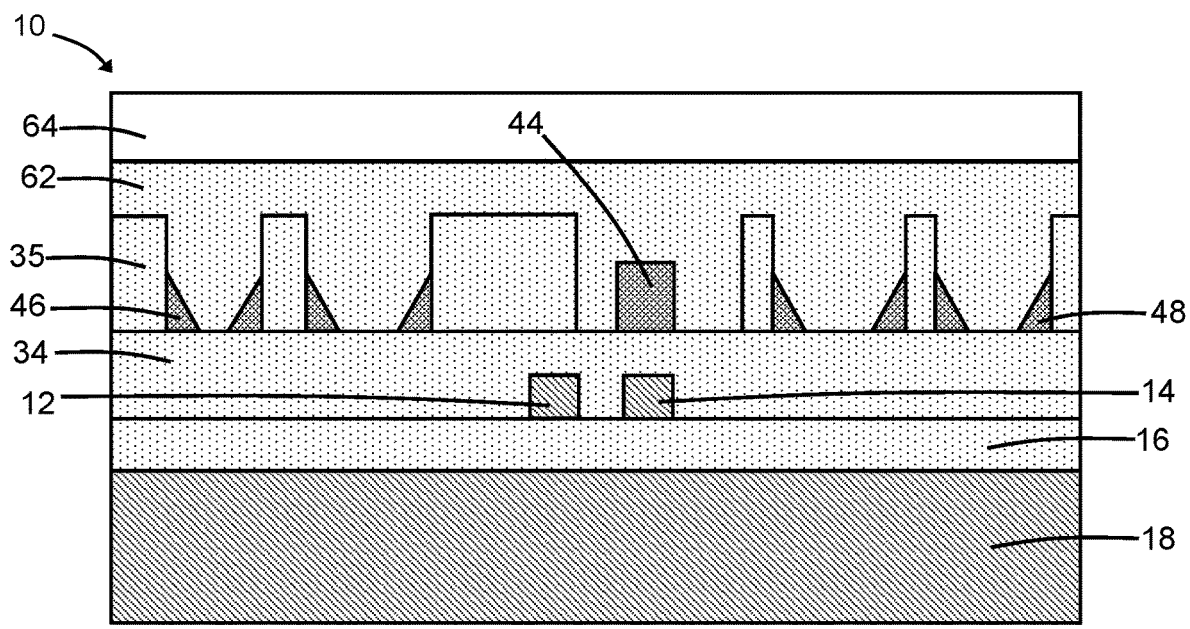
FIG. 6 is a cross-sectional view of the structure at a fabrication stage subsequent to FIG. 5.

With reference to FIG. 6 in which like reference numerals refer to like features in FIG. 5 and at a subsequent fabrication stage, a dielectric layer 62 is formed over the waveguide cores 42, 44 and elements 46, 48. The dielectric layer 62 may be comprised of a dielectric material, such as silicon dioxide, having a refractive index that is less than the refractive index of the material constituting the waveguide cores 42, 44 and elements 46, 48. The waveguide cores 42, 44 and elements 46, 48 are embedded in the dielectric layer 62, which may be deposited and planarized after deposition, because the dielectric layer 62 is thicker than the height of the waveguide cores 42, 44 and elements 46, 48.

The elements 46 may be dimensioned and positioned at small enough pitch so as to define a sub-wavelength grating that does not radiate or reflect light at a wavelength of operation. The dielectric materials of the dielectric layers 35, 62 are disposed in the gaps G1 between adjacent pairs of the elements 46. The elements 46 and the dielectric material of the dielectric layers 35, 62 in the gaps G1 between adjacent element pairs may define a metamaterial structure in which the material constituting the elements 46 has a higher refractive index than the dielectric material of the dielectric layers 35, 62. Similarly, the elements 48 may be dimensioned and positioned at small enough pitch so as to define a sub-wavelength grating that does not radiate or reflect light at a wavelength of operation. The dielectric materials of the dielectric layers 35, 62 are disposed in the gaps G2 between adjacent pairs of the elements 48. The elements 48 and the dielectric material of the dielectric layers 35, 62 in the gaps G2 between adjacent element pairs may define a metamaterial structure in which the material constituting the elements 48 has a higher refractive index than the dielectric material of the dielectric layers 35, 62. The metamaterial structures can be treated as homogeneous materials each having an effective refractive index that is intermediate between the refractive index of the material constituting the elements 46, 48 and the refractive index of the dielectric material constituting the dielectric layers 35, 62.

The waveguide cores 12, 14 and the waveguide cores 42, 44 are positioned in a lateral direction between the metamaterial structure including the elements 46 and the metamaterial structure including the elements 48. The waveguide cores 42, 44 are arranged in the same level as the metamaterial structures, and the waveguide cores 12, 14 are arranged in a different level (i.e., a lower level) than the metamaterial structures. The waveguide cores 42, 44 have lateral offsets from the metamaterial structures, and the waveguide cores 12, 14 have lateral and vertical offsets from the metamaterial structures.

A back-end-of-line stack 64 may be formed over all or part of the dielectric layer 62. The back-end-of-line stack 64 may include dielectric layers that are comprised of a dielectric material, such as silicon dioxide, silicon nitride, tetraethylorthosilicate silicon dioxide, or fluorinated-tetraethylorthosilicate silicon dioxide.

In use, light may be guided on a photonics chip by the waveguide core 42 for input to the structure 10. The light may be transferred from the tapered section 43 of the waveguide core 42 to the tapered section 20 of the waveguide core 12. A fraction of the light may be evanescently coupled from the coupling section 22 of the waveguide core 12 to the coupling section 28 of the waveguide core 14. Another fraction of the light continues to propagate in the waveguide core 12 for output from the structure 10 in the output section 24. The polarization of the fraction of the light propagating in the waveguide core 14 is rotated by the rotator section 30 and the overlapping rotator sections 52, 54 of the waveguide core 44 for output from the structure 10 in the output section 32.

The structure 10 may omit rails comprised of the material of the waveguide cores 42, 44 and elements 46, 48 in the optical path at the transition from the tapered section 43 of the waveguide core 42 to the tapered section 20 of the waveguide core 12, which may reduce optical loss and back reflection. The metamaterial structures including the elements 46, 48 may reduce the optical loss for light propagating in the structure 10. The metamaterial structures including the elements 46, 48 may be particularly effective in reducing the optical loss for light having a transverse magnetic polarization by significantly increasing the coupling length. The metamaterial structures including the elements 46, 48 may improve optical isolation and, thereby, the packaging density for a photonics chip. For example, the metamaterial structure including the elements 46 may provide effective optical isolation for an adjacent waveguide core 72 such that the waveguide core 72 can be positioned closer to the polarization splitter rotator without causing crosstalk. Although the metamaterial structures may be deployed to provide low-loss transceiver applications in conjunction with the waveguide cores 12, 14 and the waveguide cores 42, 44 of the polarization splitter rotator and edge coupler, the structure 10 may be deployed in a different type of optical component that includes one or more waveguide cores that are positioned adjacent to the elements 46, 48 of the metamaterial structures.

Figure 7:
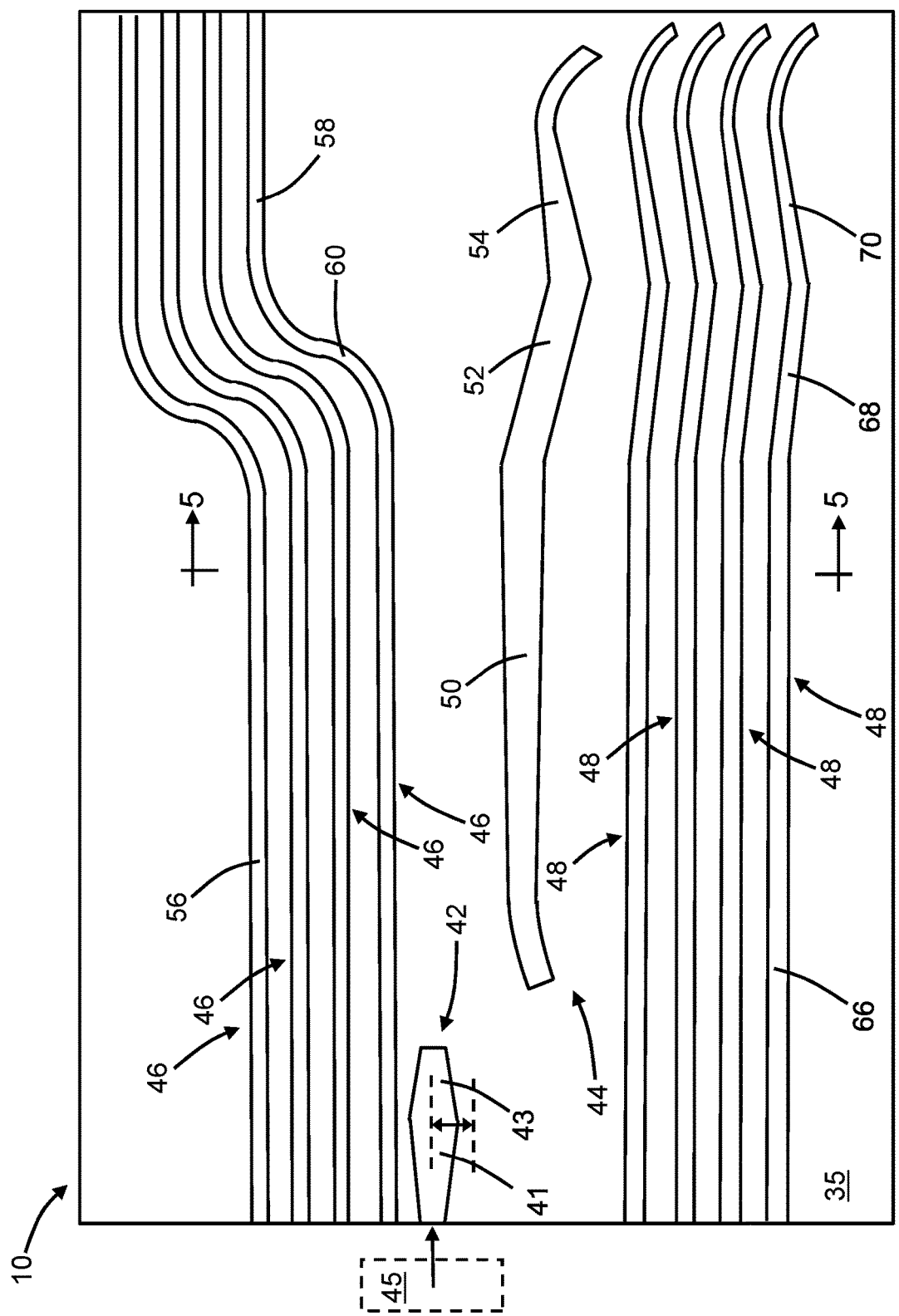
FIG. 7 is a top view of a structure in accordance with alternative embodiments of the invention.

With reference to FIG. 7 in which like reference numerals refer to like features in FIG. 4 and in accordance with alternative embodiments, the tapered section 41 of the waveguide core 42 may be offset in a lateral direction relative to the tapered section 20 of the waveguide core 12, as indicated by the parallel dashed lines and double-headed arrow. In an embodiment, the tapered section 41 may have a non-overlapping relationship with the tapered section 20 due to the offset placement.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a substrate;
   a first waveguide core positioned in a vertical direction over the substrate;
   a first metamaterial structure positioned in a lateral direction adjacent to the first waveguide core, the first metamaterial structure including a first plurality of elements separated by a first plurality of gaps and a first dielectric material in the first plurality of gaps; and a second metamaterial structure positioned in the lateral direction adjacent to the first waveguide core, the second metamaterial structure including a second plurality of elements separated by a second plurality of gaps and a second dielectric material in the second plurality of gaps.

2. The structure of claim 1 further comprising:
a dielectric layer over the substrate, the dielectric layer including a plurality of trenches having lower corners, wherein the first plurality of elements are positioned at the lower corners of the plurality of trenches.

3. The structure of claim 1 wherein the first waveguide core is positioned in the lateral direction between the first metamaterial structure and the second metamaterial structure.

4. The structure of claim 1 further comprising:
a second waveguide core positioned in the vertical direction over the substrate,
wherein the first waveguide core and the second waveguide core are positioned in the lateral direction between the first metamaterial structure and the second metamaterial structure.

5. The structure of claim 4 wherein the first waveguide core includes a first section, and the second waveguide core includes a second section positioned adjacent to the first section of the first waveguide core.

6. The structure of claim 5 wherein the first waveguide core comprises silicon, and the second waveguide core and the first metamaterial structure comprise a dielectric material selected from the group consisting of silicon nitride, silicon oxynitride, and aluminum nitride.

7. The structure of claim 4 wherein the first waveguide core includes a first section, and the second waveguide core includes a second section positioned to overlap with the first section of the first waveguide core.

8. The structure of claim 7 wherein the second waveguide core includes a third section connected to the second section, and further comprising:
a light source positioned adjacent to the third section of the second waveguide core.

9. The structure of claim 4 wherein the first waveguide core includes a first section, and the second waveguide core includes a second section that is offset in the lateral direction relative to the first section of the first waveguide core.

10. The structure of claim 9 wherein the second waveguide core includes a third section connected to the second section, and further comprising:
a light source positioned adjacent to the third section of the second waveguide core.

11. The structure of claim 1 wherein the first waveguide core comprises a first material, and the first metamaterial structure comprises a second material different from the first material.

12. The structure of claim 11 wherein the first material is silicon, and the second material is selected from the group consisting of silicon nitride, silicon oxynitride, and aluminum nitride.

13. The structure of claim 1 wherein the first waveguide core and the first metamaterial structure comprise a dielectric material selected from the group consisting of silicon nitride, silicon oxynitride, and aluminum nitride.

14. The structure of claim 1 wherein each of the first plurality of elements includes a first section, a second section, and a plurality of bends connecting the first section to the second section.

15. The structure of claim 1 wherein each of the first plurality of elements includes a first section and a second section that is angled relative to the first section.

16. The structure of claim 1 wherein the first plurality of elements are arranged in pairs.

17. The structure of claim 1 wherein the first waveguide core comprises a first material, and the first metamaterial structure and the second metamaterial structure comprise a second material different from the first material.

18. A method comprising:
forming a waveguide core positioned in a vertical direction over a substrate;
forming a first metamaterial structure positioned in a lateral direction adjacent to the waveguide core, wherein the first metamaterial structure including a first plurality of elements separated by a first plurality of gaps and a first dielectric material in the first plurality of gaps; and
forming a second metamaterial structure positioned in the lateral direction adjacent to the waveguide core, wherein the second metamaterial structure includes a second plurality of elements separated by a second plurality of gaps and a second dielectric material in the second plurality of gaps.

19. The method of claim 18 wherein the waveguide core is positioned in the lateral direction between the first metamaterial structure and the second metamaterial structure.

20. A structure comprising:
a substrate;
a waveguide core positioned in a vertical direction over the substrate;
a metamaterial structure positioned in a lateral direction adjacent to the waveguide core, the metamaterial structure including a plurality of elements separated by a plurality of gaps and a dielectric material in the plurality of gaps; and
a dielectric layer over the substrate, the dielectric layer including a plurality of trenches having lower corners, wherein the plurality of elements are positioned at the lower corners of the plurality of trenches.

* * * * *